US005259221A

United States Patent [19]

Whitmore

[11] Patent Number: 5,259,221

[45] Date of Patent: Nov. 9, 1993

[54] TRUNK LOCK WITH MANUAL RELEASE

[75] Inventor: Phillip Whitmore, Colonial Heights, Va.

[73] Assignee: Long Manufacturing Company, Inc., Petersburg, Va.

[21] Appl. No.: 847,131

[22] Filed: Mar. 6, 1992

[51] Int. Cl.[5] .......... G05B 65/48

[52] U.S. Cl. .......... 70/75; 292/DIG. 42; 70/69; 70/465

[58] Field of Search .......... 70/75, 74, 69, 465, 70/7, 8, 10, 12, 72; 292/283, DIG. 69, DIG. 42

[56] References Cited

U.S. PATENT DOCUMENTS

| | | | |
|---|---|---|---|
| 663,413 | 12/1900 | Bernstein | 70/75 |
| 837,366 | 12/1906 | Wolf | 70/69 |
| 1,310,774 | 7/1919 | Wolf | 292/DIG. 42 |
| 2,332,238 | 10/1943 | Lalonde | 70/75 |
| 2,382,756 | 8/1945 | Wagner et al. . | |
| 3,184,935 | 5/1965 | Atkinson | 292/283 |
| 4,453,387 | 6/1984 | Atkinson | 70/75 |
| 5,048,315 | 9/1991 | Rekuc | 70/75 |

FOREIGN PATENT DOCUMENTS

| | | | |
|---|---|---|---|
| 595588 | 7/1959 | Italy | 70/69 |
| 176669 | 3/1922 | United Kingdom | 70/74 |
| 434773 | 9/1935 | United Kingdom | 70/74 |

OTHER PUBLICATIONS

Long Lock Catalog No. 155, cover and pp. 5-6 (no date).

"Everlasting Locks" by Atkinson and Long Manufacturing Co., Inc. Catalog No. 140, cover and pp. 1-3 (no date).

*Primary Examiner*—Peter M. Cuomo
*Assistant Examiner*—Darnell M. Boucher
*Attorney, Agent, or Firm*—Mason, Fenwick & Lawrence

[57] ABSTRACT

A lock has a keeper plate for attachment to a first relatively moveable part of the trunk, which keeper plate has a peripheral rim bounding a circular keeper opening and having a slot formed therein. An attachment plate is affixed to a second relatively moveable part of the trunk, while a hasp member is hingedly connected at one to the attachment plate and adapted at the other end to overlie the peripheral rim and the keeper opening when in a mated position. A hollow cylindrical bolt housing of cup-shaped configuration is fixed to and projects rearwardly of the hasp member. The bolt housing includes a cylindrical wall having a bolt opening therein positioned to align with the slot when the hasp member and the latching plate assume the mated position. A latching bolt is supported in the bolt housing for movement along an axis paralleling a diameter of the bolt housing, and has a free end portion aligned with the bolt opening. A spring continuously biases the free end portion to project through the bolt opening for automatically interlocking with the slot. A semi-annular lever is mounted behind the keeper plate substantially concentric with the keeper opening, and is pivotable about one end to move the bolt radially inwardly against the spring to free the bolt from the slot in the rim around the keeper opening.

7 Claims, 2 Drawing Sheets

TRUNK LOCK WITH MANUAL RELEASE

BACKGROUND OF THE INVENTION

1. Field of the Invention

The present invention relates in general to trunk locks and more particularly to trunk locks of the type having facilities for manual release of the lock from latched condition without the use of a key and which require a key to secure the same in locked condition.

2. Related Art

Heretofore, it has been customary for trunk locks to close automatically. That is to say, the bolts or plungers on the hasp of the trunk lock are customarily spring loaded and bevelled so that the locking mechanism, when mated with its latching or keeper plate, locks itself by engaging the plungers or bolts in corresponding slots or holes in the latching plate. In such an arrangement a key must be used in order to open the, lock. This construction or trunk locks has been inconvenient to both the retailer and to the consumer, usually due to the fact that a key is required each time it is desired to open the trunk. Often the key is found to be inside the trunk, necessitating the production of duplicate keys or forcing of the lock to gain access to the trunk. When trunks having such conventional trunk locks are stored or displayed in retail establishments, the keys are usually attached by string to the trunk handle and a significant proportion of such keys become detached and lost from their associated trunks through accident or pilfering. Also at the retail level, the keys attached by string to the trunk handle are frequently placed through careless handling on the inside of the trunk, thus producing a lock out.

U.S. Pat. No. 3,184,935 presented one solution to this problem, a lock operated by a pair of spring-loaded bolts and hinged loop or bail coupled to bolts to release them without use of the key. However, this required location of the bail on the key cylinder member, where it could interfere with introduction of the key into the key slot.

It is to solution of these and other problems to which the present invention is directed.

SUMMARY OF THE INVENTION

Therefore, it is a primary object of the present invention to provide a trunk lock wherein the lock can be opened from an automatic latched condition without the use of the key.

Another object of the present invention is the provisions of a trunk lock of the type having a spring biased bolt or plunger on a hinged hasp which automatically latches with a co-operating latching plate when the hasp is moved to a latched position, but which can be released without a key by means of a manually operable element.

These and other objects of the invention are achieved by a lock for trunks and the like of the type having a keeper plate for attachment to a first relatively moveable part of the trunk, which keeper plate has a peripheral rim bounding a circular keeper opening, and a slot or cut-out formed in said peripheral rim. The lock further includes a hasp assembly including an attachment plate to be affixed to a second relatively moveable part of the trunk and a hasp member hingedly connected to the attachment plate, the hasp member having a free end portion adapted to overlie the peripheral rim and the keeper opening when in a mated position. A hollow cylindrical bolt housing of cup-shaped configuration is fixed to and projects rearwardly of the hasp member to nest in the keeper opening when the hasp member and the latching plate assume the mated position.

The bolt housing includes a cylindrical wall having a bolt opening therein positioned to align with the slot in the peripheral rim when the hasp member and the latching plate assume the mated position. A latching bolt member is supported in the bolt housing for movement along an axis paralleling a diameter of the bolt housing, and has a free end portion aligned with the bolt opening. A spring continuously biases the free end portion to project through the bolt opening for automatically interlocking with the slot in the peripheral rim in the keeper opening.

A semi-annular lever is mounted behind the keeper plate substantially concentric with the keeper opening. The lever is mounted for pivotable movement about a first end and has a second end extending in front of the keeper plate outwardly of the peripheral rim. The lever can be pivoted to move the bolt radially inwardly against the spring to free the bolt from the slot in the rim around the keeper opening, to cause the hasp member to be released from the keeper plate.

BRIEF DESCRIPTION OF THE DRAWINGS

The invention is better understood by reading the following Detailed Description of the Preferred Embodiments with reference to the accompanying drawing figures, in which like reference numerals refer to like elements throughout, and in which.

DETAILED DESCRIPTION OF THE PREFERRED EMBODIMENTS

Figure 1:
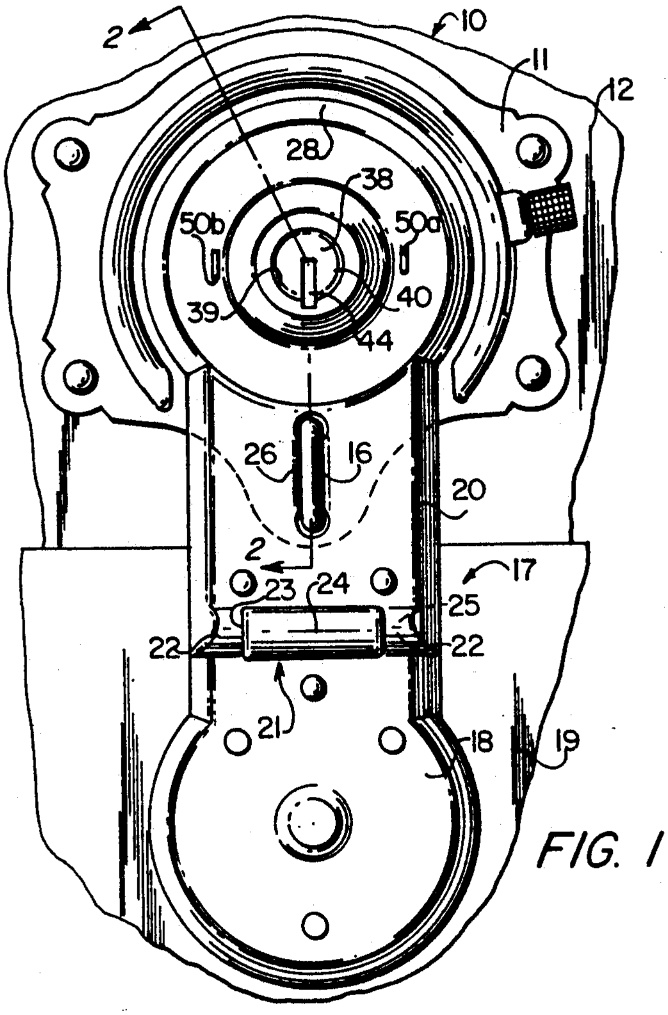
FIG. 1 is a front elevation of a trunk lock having a manual release in accordance with the present invention.
Figure 2:
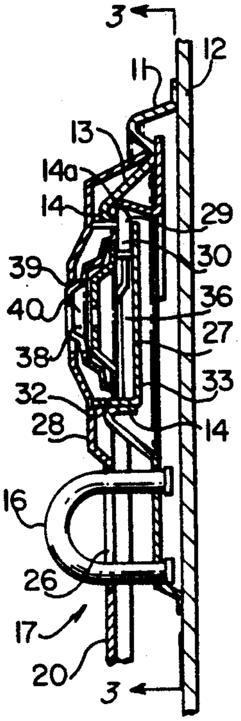
FIG. 2 is a cross-sectional view of the lock of FIG. 1, taken along line 2—2 of FIG. 1.
Figure 3:
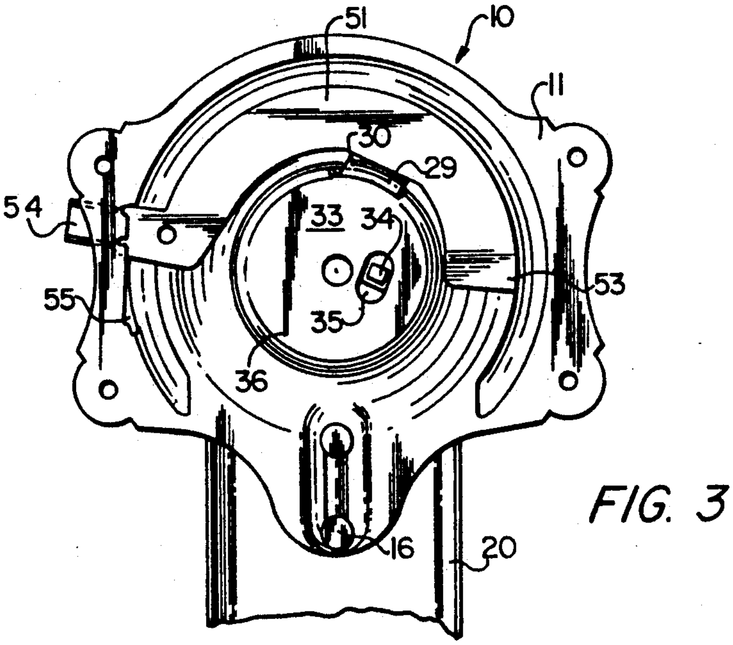
FIG. 3 is a cross-sectional view of the lock of FIG. 1, taken along line 3—3 of FIG. 2.

In describing preferred embodiments of the present invention illustrated in the drawings, specific terminology is employed for the sake of clarity. However, the invention is not intended to be limited to the specific terminology so selected, and it is to be understood that each specific element includes all technical equivalents which operate in a similar manner to accomplish a similar purpose.

Referring to the drawing, the trunk lock of the present invention is indicated in general by the reference character 10. Trunk lock 10 is of the same general construction as the trunk lock disclosed in U.S. Pat. No. 3,184,935, which is incorporated herein by reference in its entirety.

As shown in FIGS. 1-5, trunk lock 10 includes a latching plate or keeper plate 11 of conventional configuration adapted to be affixed to one of the separable trunk sections, for example the trunk cover or lid 12, and having the usual raised annular wall portion 13 terminating in a peripheral rim 14 bounding the keeper opening 15 and terminating above the plane of keeper plate 11; and also including in the embodiment herein illustrated a padlock staple 16. Cooperating with the latching plate 11 is a hasp assembly 17 of generally conventional configuration including an attached plate 18 adapted to be affixed to the other separable trunk section, for example the trunk body 19, has a hasp member 20 connected by means of a conventional hinge connection 21 to the attached plate 18. The hinge connection 21, may, for example, be formed by a pair of laterally spaced knuckle formations 22 on the hasp member 20 laterally flanking an opening 23, coacting with a loop or bead 24 on the attached plate 18 having a width complementing the opening 23 and extending between the knuckle formations 22, to receive a hinge pin 25.

The hasp member 20 has an elongated opening 26 intermediate its length to receive the padlock staple 16 therethrough and has a latch mechanism generally designated by the reference character 27 affixed to the enlarged end portion 28 of the hasp member 20 which overlies the keeper opening 15 and bounding portions of wall 13 of the latching plate 11 when the trunk lock is in a closed position. The latch mechanism 27 includes a bolt or plunger 29 having a bevelled end portion 30 projecting through an opening 31 in the cylindrical wall 32 of the bolt housing 33 and engaging an aligned slot or cut-out 14*a* in the peripheral rim 14 bounding the keeper opening 15.

Figure 4:
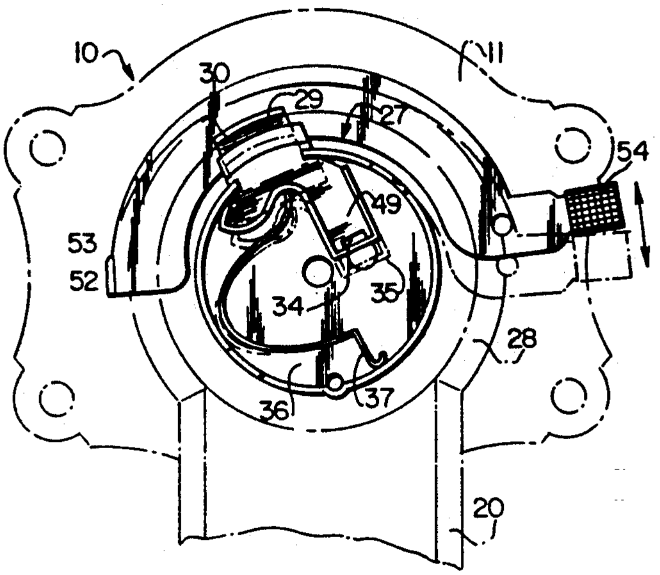
FIG. 4 is a partial front elevation of the manual release of the trunk lock of FIG. 1.
Figure 6:
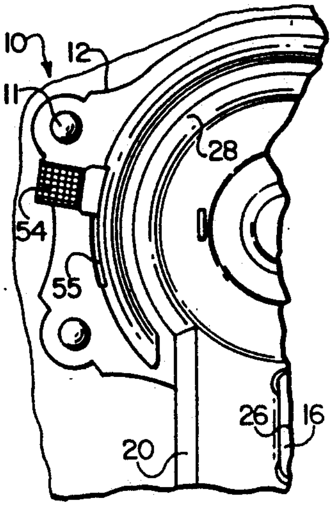
FIG. 6 is a partial front elevation of an alternative embodiment of the trunk lock of FIG. 1.
Figure 5:
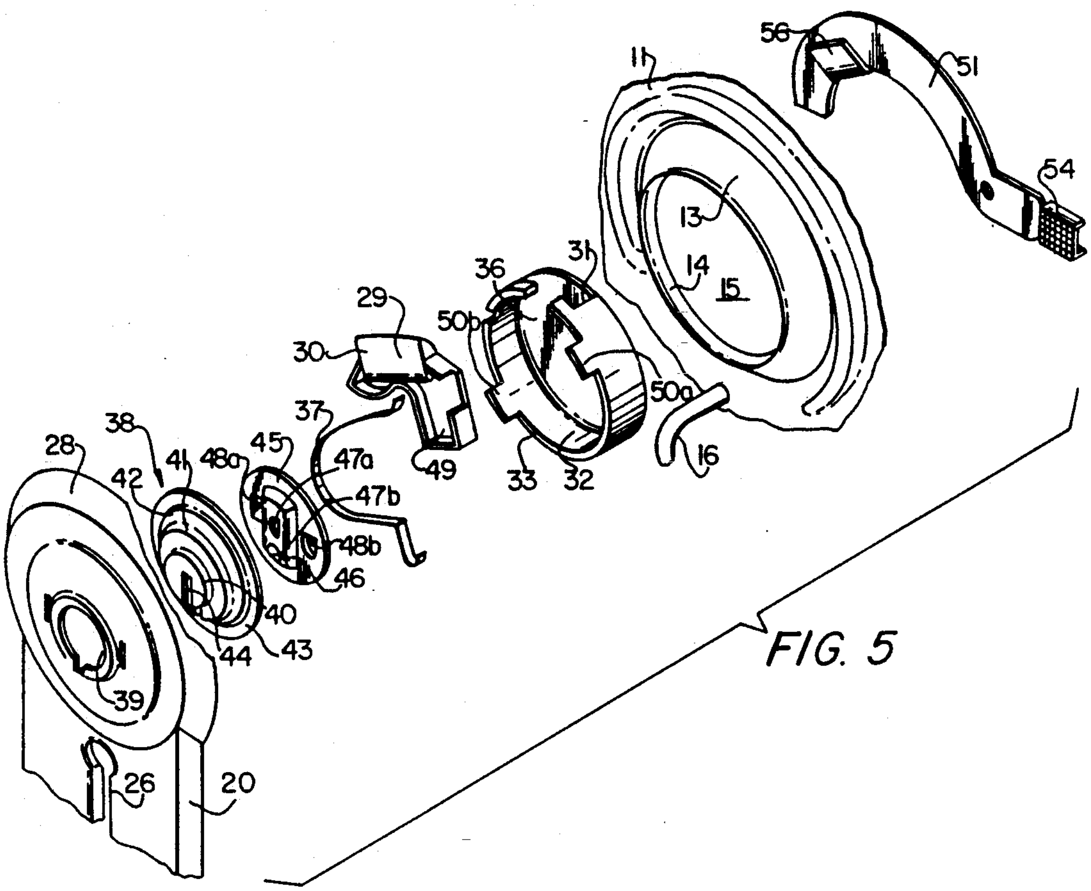
FIG. 5 is an exploded perspective view of the lock mechanism portion of the hasp.

As best shown in FIGS. 4 and 5, the housing 33 comprises a cup-shaped body which projects inwardly toward the trunk from the enlarged end portion 28 of hasp member 20 to be received within the keeper opening 15. The bolt 29 is guided for movement along an axis paralleling a diameter of the bolt housing 33 by sliding engagement of the lateral edges of the bolt end portion 30 with the lateral edges of the opening 31 and by a pin like projection 34 on the opposite or radially inward end of the bolt 29 extending into slot 35 in the circular rear wall 36 of the bolt housing 33. Bolt 29 is continuously urged radially outwardly by a spring 37 and is limited in its outward movement by engagement of shoulders at appropriate points along the sides of bolt 29 with the lateral edges of the bolt opening 31 in the cylinder wall 32.

A key cylinder member 38 projects through and is journalled in a suitable aperture 39 in the enlarged portion 28 of the hasp member 20. Key cylinder member 38 comprises an upper raised portion 40 having intermediate and lower annular shoulder portions 41 and 42 with successively larger diameters and terminating with an annular outwardly-projecting flange 43 extending from the bottom edge of the lower shoulder portion 42. Flange 43 has a diameter greater than that of the lower shoulder portion 42 and bears against the surfaces of bolt 29 and spring 37. A radial key slot 44 is formed in upper raised portion 40 and intermediate annular shoulder portion 41.

An actuator disc 45, shown in FIG. 5, lies forwardly of the bolt 29 within the bolt housing 33 and has a diameter corresponding substantially to the inner diameter of the lower annular portion 42 of key cylinder member 38 to rotatably support the disc in concentric relation with the key cylinder member 38. The disc 45 includes an elongated recess 46 which projects into intermediate shoulder portion 41 and is provide with the usual radially-aligned key follower apertures 47*a* and 47*b*; and further has a pair of radially-opposite eccentric drive pins 48*a* and 48*b*, one of which projects into socket 49 of the bolt 29 and the other of which bears against the spring 37 to force the bolt 29 radially inwardly against the force of the spring 37 when the actuator disc 45 is rotated through a selected arc from its normal position by rotation of a key engaging key slot 44 and key follower apertures 47*a* and 47*b*.

As the bolt housing 33 is fixed to the hasp member 20, as by the usual mounting lugs 50*a* and 50*b* projecting through aligned slots in hasp member 20 and deformed or expanded to form a suitable mounting, the bolt 29 when in the outwardly-biased position engages the aligned cut-out 14*a* in keeper opening 15, thus preventing the hasp member 20 from being released from the keeper plate 11.

In order to facilitate manual, inwardly-radial movement of the bolt 29 to release the hasp member 20 from the keeper plate 11, a semi-annular release lever 51 (best shown in FIGS. 3 through 5) is mounted behind keeper plate 11 substantially concentric with keeper opening 15 for pivotable movement about one end. Lever 51 can be mounted to keeper plate 11 by a mounting lug 52 projecting through an aligned slot 53 in annular wall portion 13 of keeper plate 11. An operating tab 54 extends outwardly from release lever 51 through an elongated slot 55 in keeper plate 11 opposite elongated slot 53, in order to effect pivoting motion of release lever 51; and a release finger 56 extends upwardly from the inner edge of release lever 51 in alignment with cut-out 14*a* in keeper opening 15. Normally, release lever 51 is maintained in the upward position under the upper half of keeper plate 11 by pressure from bolt 29 against the release finger 56.

However, when it is desired to manually unlock the trunk lock, the release lever 51 can be pivoted downward by pressure upon the operating tab 54, to cause release finger 56 to depress bolt 29 radially inwardly and cause it to withdraw from cut-out 14*a*, thus freeing the hasp member 20 for opening movement about the hinge connection 21.

To move the trunk lock to a latched condition, the operator merely pivots hasp member 20 about hinge 21 in a direction to project the bolt housing 33 into the keeper opening 15, during which the bevelled end 30 of bolt 29 will abut the rim 14 and cam inwardly, and then snap outwardly underneath rim 14 into the cut-out 14*a*. As will be appreciated by those of skill in the art, means can be provided to lock the trunk lock in this latched position using a key, whereby bolt 29 cannot be operated by release lever 51.

Modifications and variations of the above-described embodiments of the present invention are possible, as appreciated by those skilled in the art in light of the above teachings. For example, release lever 51 can be constructed to operate with its operating tab 54 provided on the left-hand side of keeper plate 11. As will be appreciated by those of skill in the art, the structure of trunk lock 10, and particularly of latch mechanism 27, keeper plate 11, and release lever 51 will then be a mirror image of that shown in FIGS. 1–5.

It is therefore to be understood that, within the scope of the appended claims and their equivalents, the invention may be practiced otherwise than as specifically described.

What is claimed is:

1. A lock for an article having first and second relatively moveable parts, comprising:

a keeper plate for attachment to the first relatively moveable part of the article, said keeper plate having a circular keeper opening therein, a peripheral rim bounding said circular keeper opening, and a slot formed in said peripheral rim;

a hasp assembly including an attachment plate to be affixed to the second relatively moveable part of the article and a hasp member hingedly connected to said attachment plate, said hasp member having a free end portion adapted to overlie said peripheral rim and said keeper opening when in a mated position;

a hollow cylindrical bolt housing of cup-shaped configuration fixed to and projecting rearwardly of said hasp member to nest in said keeper opening when said hasp member and said latching plate assume said mated position, said bolt housing including a cylindrical wall having a bolt opening therein positioned to align with said slot in said peripheral rim when said hasp member and said latching plate assume said mated position, a latching bolt member supported in said bolt housing for movement along an axis paralleling a diameter of said bolt housing and having a free end portion aligned with said bolt opening, biasing means for continuously biasing said free end portion to project through said bolt opening for automatically interlocking with said slot in said peripheral rim in said keeper opening; and a semi-annular lever having first and second ends and an arcuate inner edge, said inner edge of said lever being substantially concentric with said keeper opening and said lever being mounted behind said keeper plate for pivotable movement about said first end, said inner edge bearing against said free end portion of said bolt member when said lever is in a pivoted position, and said second end extending in front of said keeper plate outwardly of said peripheral rim.

2. The lock of claim 1, wherein said keeper plate has an elongated slot therein generally diametrically opposite said first end of said lever, and wherein said second end of said lever extends through said elongated slot.

3. The lock of claim 2, wherein said second end of said lever includes an operating tab.

4. The lock of claim 1, wherein said inner edge of said lever includes an upwardly extending release finger in alignment with said slot in said keeper opening.

5. A lock for an article having first and second relatively moveable parts, comprising:

a keeper plate for attachment to the first relatively moveable part of the article, said keeper plate having a circular keeper opening therein, a peripheral rim bounding said circular keeper opening, a bolt-receiving slot formed in said peripheral rim, a lug-receiving slot formed in said keeper plate radially outwardly of said keeper opening, and an elongated slot formed in said keeper plate generally diametrically opposite said lug-receiving slot;

a hasp assembly including an attachment plate to be affixed to the second relatively moveable part of the article and a hasp member hingedly connected to said attachment plate, said hasp member having a free end portion adapted to overlie said peripheral rim and said keeper opening when in a mated position;

a cylindrical bolt housing fixed to and projecting rearwardly of said hasp member to nest in said keeper opening when said hasp member and said latching plate assume said mated position, said bolt housing including a cylindrical wall having a bolt opening therein positioned to align with said slot in said peripheral rim when said hasp member and said latching plate assume said mated position, a latching bolt member supported in said bolt housing for movement along an axis paralleling a diameter of said bolt housing and having a free end portion aligned with said bolt opening, biasing means for continuously biasing said free end portion to project through said bolt opening for automatically interlocking with said slot in said peripheral rim in said keeper opening; and a semi-annular lever having first and second ends and an arcuate inner edge, said inner edge of said lever being substantially concentric with said keeper opening and said lever being mounted behind said keeper plate for pivotable movement about said first end, said inner edge bearing against said free end of said bolt member when said lever is in a pivoted position, said first end including a lug projecting through said lug-receiving slot, and said second end extending through said elongated slot in front of said keeper plate outwardly of said peripheral rim.

6. The lock of claim 5, wherein said inner edge of said lever includes an upwardly extending release finger in alignment with said slot in said keeper opening.

7. A lock for an article having first and second relatively moveable parts, comprising:

a keeper plate for attachment to the first relatively moveable part of the article, said keeper plate having a circular keeper opening therein, a peripheral rim bounding said circular keeper opening, and a slot formed in said peripheral rim;

a hasp assembly including an attachment plate to be affixed to the second relatively moveable part of the article and a hasp member hingedly connected to said attachment plate, said hasp member having a free end portion adapted to overlie said peripheral rim and said keeper opening when in a mated position;

a hollow bolt housing fixed to and projecting rearwardly of said hasp member to nest in said keeper opening when said hasp member and said latching plate assume said mated position, said bolt housing including a cylindrical wall having a bolt opening therein positioned to align with said slot in said peripheral rim when said hasp member and said latching plate assume said mated position, a latching bolt member supported in said bolt housing for movement along an axis paralleling a diameter of said bolt housing and having a free end portion aligned with said bolt opening, biasing means for continuously biasing said free end portion to project through said bolt opening for automatically interlocking with said slot in said peripheral rim in said keeper opening; and a semi-annular lever having first and second ends, and an arcuate inner edge, said inner edge including an upwardly extending release finger intermediate said first and second ends, said inner edge of said lever being substantially concentric with said keeper opening and said lever being mounted behind said keeper plate for pivotable movement about said first end with said finger in alignment with said slot in said keeper opening, said finger bearing against said free end portion of said bolt member when said lever is in a pivoted position, and said second end extending in front of said keeper plate outwardly of said peripheral rim.

* * * * *